United States Patent [19]
Tokuyama et al.

[11] 3,785,043
[45] Jan. 15, 1974

[54] METHOD OF PRODUCING SEMICONDUCTOR DEVICES

[75] Inventors: Takashi Tokuyama, Hoya; Takaaki Mori, Kokubunji, both of Japan

[73] Assignee: Hitachi, Ltd., Tokyo, Japan

[22] Filed: Apr. 23, 1971

[21] Appl. No.: 136,815

Related U.S. Application Data

[62] Division of Ser. No. 716,033, March 26, 1968, Pat. No. 3,632,433.

[30] Foreign Application Priority Data

Mar. 29, 1967 Japan ............................... 42-19093

[52] U.S. Cl. ....................... 29/578, 29/588, 148/187
[51] Int. Cl. ............................................ B01j 17/00
[58] Field of Search ....................... 148/187; 29/578, 29/588

[56] References Cited

UNITED STATES PATENTS

| | | | |
|---|---|---|---|
| 3,334,281 | 8/1967 | Ditrick | 317/235 |
| 3,481,781 | 12/1969 | Kern | 117/215 |
| 3,490,963 | 1/1970 | Sprague | 148/187 |

*Primary Examiner*—Charles W. Lanham
*Assistant Examiner*—W. C. Tupman
*Attorney*—Craig, Antonelli & Hill

[57] ABSTRACT

A first insulating film of silicon dioxide is provided on the surface of a semiconductor device, and a second silicon dioxide layer containing uniformly a small amount of phosphorus is deposited from the vapor phase on said first insulating film, thereby realizing stable passivation of the electrical characteristics of said semiconductor device. The water-proof property and accurate etching of said films are also accomplished.

2 Claims, 16 Drawing Figures

INVENTORS
TAKASHI TOKUYAMA
and TAKAAKI MORI
BY Craig, Antonelli & Hill
ATTORNEYS INVENTORS
TAKASHI TOKUYAMA
and TAKAAKI MORI
BY Craig, Antonelli & Hill
ATTORNEYS INVENTORS
TAKASHI TOKUYAMA
and TAKAAKI MORI BY Craig, Antonelli & Hill
ATTORNEYS INVENTORS
TAKASHI TOKUYAMA
and TAKAAKI MORI BY Craig, Antonelli + Hill
ATTORNEYS

METHOD OF PRODUCING SEMICONDUCTOR DEVICES

CROSS-REFERENCES TO RELATED APPLICATIONS

This application is one of two divisional applications of the application Ser. No. 716,033 filed Mar. 26, 1968, now U.S. Pat. No. 3,632,433.

BACKGROUND OF THE INVENTION

1. Field of the Invention

The present invention relates to a method of producing semiconductor devices, and more particularly to a method of producing an effective passivation film for semiconductor devices.

2. DESCRIPTION OF THE PRIOR ART

It is widely practical to form a semiconductor device such as a diode, a transistor and an integrated circuit (IC) in the following manner. Namely, an $SiO_2$ film is provided on a semiconductor substrate, and the photoresist technique is applied to the $SiO_2$ film to make at least one hole or window having a desired form. A P type or N type impurity is diffused into the semiconductor substrate through the hole to form one or more PN junctions extending to the surface. Specifically, a device obtained by the technique of selective impurity diffusion is called a planar type semiconductor device.

In a semiconductor device of this type the PN junction exposed at the surface of the substrate is covered with an $SiO_2$ film. So, the electrical characteristics are extremely stable compared to those of a semiconductor device whose substrate is left exposed.

The $SiO_2$ film on the surface of the semiconductor substrate is formed by a known technique. The present method used for a silicon substrate is thermal oxidation of the substrate surface. A pyrolytic method of monosilane or organo-oxysilane is also used. Other methods are sputtering, vacuum evaporation, anodic oxidation, etc.

Generally, the $SiO_2$ film used for the selective diffusion of impurity into the semiconductor substrate remains as a passivation film for the substrate. However, since the $SiO_2$ film used as a diffusion mask is contaminated by the impurity, it is in some cases removed after a given impurity is selectively diffused into the semiconductor substrate. Then a fresh clean $SiO_2$ film is coated on the semiconductor surface as a passivation film.

When the material of the substrate of the semiconductor device is not silicon, the $SiO_2$ passivation film is obtained usually by the pyrolytic method of monosilane or organo-oxysilane.

When an $SiO_2$ film is provided on the substrate of a semiconductor device, contaminant ions such as $Na^+$ which is mobile by the electric field are introduced therein during the process of forming the $SiO_2$ film. It is known that the contaminant ions in the $SiO_2$ film, the charge brought about by the structural defect existing in the Si - $SiO_2$ interface, and mobile ions in the $SiO_2$ film are responsible for the tendency of the surface of the silicon substrate to become N type (which is referred to as an N type channel). Specifically, the mobile ions which produce an electric field in the $SiO_2$ film cause a large variation in the N type tendency when the temperature rises higher than 200° to 300° C. In order to eliminate such unstable electrical characteristics the mobile ions of this type should be decreased. If the oxidation process of the silicon surface is performed in a highly cleaned environment, it is possible to obtain a semiconductor device with the $SiO_2$ film hardly influenced by temperature and electric field.

Generally in the case of a planar transistor and an integrated circuit, the final product cannot be obtained without experiencing unclean processes such as diffusion, photo-resist and electrode formation.

Consequently, however clean the initial oxidation process may be made, $SiO_2$ remaining on the surface of the final product cannot be maintained in a pure state. A temperature rise during the operation of the transistor and integrated circuit and the electric field leaking into $SiO_2$ from the end portion of the junction cause the mobile ions in $SiO_2$ to migrate and change the surface properties. Therefore, the physical quantities influenced by the surface properties, such as the current amplification factor, the reverse current of the junction, and the reverse breakdown voltage, change. In order to prevent such phenomena it is proposed to diffuse phosphorus pentoxide ($P_2O_5$) into part of the surface layer of the $SiO_2$ film covering the surface of the device to form an $SiO_2$ layer containing phosphorus. (This layer is generally called a phospho-silicate glass layer. In the specification, an $SiO_2$ layer containing phosphorus will hereinafter be referred to as a phospho-silicate glass layer.) The gettering action of $P_2O_5$ immobilizes Na ions in $SiO_2$.

As described in detail in Japanese Pat. Publication No. 12178/1966 of IBM of the U.S.A., $POCl_3$ and $PH_3$, etc. are made to react with the surface of $SiO_2$ film in an oxydizing atmosphere at an elevated temperature near 1,000° C for several hours to diffuse $P_2O_5$ into the surface of the $SiO_2$ film.

In this case although the stabilization of surface properties is rather good, there exist considerable disadvantages. The first is that the diffusion of $P_2O_5$ into the $SiO_2$ film requires a high temperature and a long period of time. So, the impurity diffused into the semiconductor substrate diffuses again during the $P_2O_5$ diffusion and changes the electrical characteristics of the semiconductor substrate. The second is that when the $SiO_2$ film has an extremely high concentration of phosphorus it begins to have a hygroscopic property. So, the passivation against an external atmosphere, especially moisture, becomes considerably poor. In order to obviate this disadvantage a heat treatment is applied to out diffuse phosphorus from the surface of the phospho-silicate glass layer and to decrease to some degree the concentration of phosphorus in the $SiO_2$ surface. In this case the heat treatment requires also a high temperature and a long period of time. The third is that the phospho-silicate glass layer thus obtained is liable to be eroded by an etching solution, e.g. HF for the oxide film. The inventors have found after investigations that the etching rate of the glass layer by such an etching solution increases exponentially with the amount of $P_2O_5$ contained in $SiO_2$.

In the said Japanese Pat. Publication No. 12178/1966 it is described that the composition of the phospho-silicate glass layer thus obtained is $P_2O_5 \cdot SiO_2$. Its etching rate by the P-etch solution (e.g. $HF:HNO_3:H_2O = 15:10:300$ by volume), which is one of the etching solutions for oxide films widely used in semiconductor engineering, is very rapid, i.e. 200 to several hundred A/sec at room temperature. On the other hand, the $SiO_2$ film formed by the high temperature thermal oxidation of the silicon substrate has a very low etching rate, i.e. only 2 A/sec. In such a double layer structure consisting of the phospho-silicate glass layer and the $SiO_2$ layer having high and low etching rates, respectively, it is considerably difficult to make a through-hole with a micron order accuracy by the well-known photo-resist technique due to the occurrence of the side-etching phenomenon. Namely, while the $SiO_2$ layer is being etched, the phospho-silicate glass layer is etched in the lateral direction to a large degree.

According to the research by the inventors, it is found that if one $P_2O_5$ molecule traps one Na ion in the ratio of 1 : 1, the above-mentioned phospho-silicate glass having such a high concentration of phosphorus is unnecessary. Even a much lower concentration of $P_2O_5$ is sufficient to keep a stable characteristic. The inventors have tried to reduce the concentration of phosphorus in a $POCl_3$ atmosphere and to decrease the temperature of the introduction treatment of phosphorus as much as possible. Although $P_2O_5$ in $SiO_2$ can be decreased to 5 to 10 mole percent, the etching rate of the phospho-silicate glass layer by the above-mentioned etching solution is still about 200 A/sec, which is about 100 times as fast as that of the $SiO_2$ film. So the side etching phenomenon cannot be totally eliminated.

SUMMARY OF THE INVENTION

An object of this invention is to provide a method of producing a semiconductor device having a phospho-silicate glass layer of a low phosphorus concentration as a surface passivation film.

Another object of this invention is to provide a method of producing a semiconductor device having phospho-silicate glass with the water-proof property as a surface passivation film.

Still another object of this invention is to provide a method of producing a semiconductor device in which the electrical characteristics thereof are stabilized and an accident of short-circuiting among electrode metals occurs hardly.

Essentially, this invention consists in the following two points, namely depositing on the surface of an $SiO_2$ layer a mixture layer (i.e. phospho-silicate glass layer) of $P_2O_5$ and $SiO_2$ by means of the vapor phase reaction so as to keep the concentration of phosphorus in the phospho-silicate glass layer below a certain limit, and thereafter heating the structure for a short time to a temperature higher than the deposition temperature of the phospho-silicate glass.

As described before, according to a conventional well-known method of forming a phospho-silicate glass layer on the $SiO_2$ film surface, by the reaction of $P_2O_5$ vapor with the $SiO_2$ film surface at about 1,000° C in an oxydizing atmosphere, it is impossible to decrease the concentration of phosphorus in the phospho-silicate glass layer. According to this invention, when $SiO_2$ is formed by a low temperature reaction using for example the following reaction, $$SiH_4 + 2O_2 \rightarrow SiO_2 + 2H_2O,$$

a small amount of $P_2O_5$ is preliminarily introduced into $SiO_2$ using for example $PH_3$ gas. So, an $SiO_2$ ($P_2O_5 \cdot SiO_2$) layer containing phosphorus is deposited on the surface of the $SiO_2$ layer converting the surface of the semiconductor substrate. It is seen, therefore, that according to this invention phospho-silicate glass can be made at 250° to 550° C which is much lower than that in the conventional method. So, P and N type impurities introduced in the semiconductor substrate do not diffuse again, and the electrical characteristics do not vary with the formation of phospho-silicate glass.

Another difference between the inventive method and the conventional method is that the distribution of phosphorus in the phospho-silicate glass layer is different. In the case of the conventional method the concentration of phosphorus is extremely large at the surface and decreases exponentially toward the interior of the phospho-silicate glass layer, while in the case of the inventive method it is uniform throughout the deposited phospho-silicate glass layer or it is arbitrarily adjustable, the etching rate of the glass layer being able to be controlled largely by the concentration of phosphorus and the heat treatment after deposition.

In this invention the etching rate of the phospho-silicate glass layer by the P- etching solution is selected to be lower than 10 A/sec at room temperature or preferably lower than 5 A/sec. It is proved that the phospho-silicate glass whose etching rate is within the above limit has an excellent water-proof property.

Further, according to this invention the structure is subjected to heat treatment for a short time. This means that the precess not only controls the etching rate but also stabilizes the surface properties of the semiconductor substrate. At this time care has to be taken so that phosphorus in the phospho-silicate glass may diffuse into the $SiO_2$ layer during the thermal treatment but may not pass through it into the semiconductor surface.

In this specification the stabilization of the silicon surface properties will be expressed in terms of $N_{FB}$ ($cm^{-3}$) which corresponds to the negative charge density induced on the semiconductor surface, namely by the variation $\Delta N_{FB}$ of $N_{FB}$ occurred when subjected to a so-called B.T. treatment (Bias Temperature Treatment), which is a heat treatment effected in the state of a bias voltage being applied between the $SiO_2$ film and the semiconductor. The measured value of $N_{FB}$ is estimated from $V_{FB}$ showing the inflexion point of the voltage-capacitance characteristic of an MOS device (Metal Oxide Semiconductor device), which corresponds to the voltage applied externally to the MOS type device in the reverse direction to cancel the negative surface charge. The variation in the $V_{FB}$ due to the B.T. treatment will be expressed by $\Delta V_{FB}$. The BT treatment consists of the application of an electric field of $10^5$ to $10^6$ V/cm and a simultaneous heat treatment at 200° C for 60 minutes. The direction of the applied electric field is selected so that the metal electrode of the MOS type device becomes positive. So, if there are positive ions such as Na ions in $SiO_2$ film, they are collected to the silicon surface and cause an increase in $N_{FB}$ ($\Delta N_{FB} > 0$).

In the embodiment of this invention described hereinbelow the concentration of phosphorus in the phospho-silicate glass layer and the temperature of heat treatment after the formation of the phospho-silicate glass are so selected that $\Delta V_{FB}$ is less than 10 V, or generally nearly zero. When $\Delta V_{FB} = 0$, the surface properties are independent of stress due to temperature and electric field, which is the most favorable state.

FIGS. *9a–9h* are cross-sectional views schematically illustrating the process steps of manufacturing a semiconductor device according to the present invention.

DESCRIPTION OF THE PREFERRED EMBODIMENTS

Figure 1:
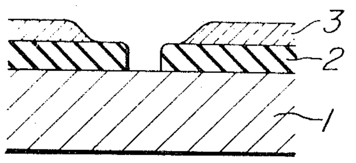
FIG. 1 PRIOR ART
FIG. 1 is a longitudinal sectional view showing schematically the etching state of a known phospho-silicate glass - $SiO_2$ dual structure film.

In FIG. 1 an $SiO_2$ layer 2 is formed on the surface of a silicon substrate 1 by a thermal oxidation method. Then heat treatment is made at about 1,100° C in an atmosphere of $POCl_3$ and $O_2$ to diffuse $P_2O_5$ into the surface of the $SiO_2$ layer 2 and to form a phospho-silicate glass layer 3 thereon. The photo-resist technique is applied to the $SiO_2$ layer 2 of the sample thus obtained to form holes reaching the surface of the silicon substrate for the provision of electrodes to the semiconductor device. FIG. 1 shows schematically the shape of the hole. Since the phospho-silicate glass layer 3 formed by the known method has a high concentration of phosphorus, the etching rate thereof is much higher than that of the $SiO_2$ film 2, thereby causing the side-etching phenomenon.

This phenomenon brings about the connection between holes of adjacent regions in a micro-pattern transistor or in an integrated circuit having a high density of integration of fine patterns. As a result short-circuiting of junctions by the electrodes such as aluminium mounted thereon frequently occurs. This tendency is a crucial problem in a device for high frequency usage having a micro electrode structure. As a countermeasure, an $SiO_2$ layer is coated on the phospho-silicate glass, or a high temperature treatment is made just after the formation of the phospho-silicate glass to diffuse a certain amount of phosphorus out of the surface portion of the phospho-silicate glass layer. However, these methods are not considered to be sufficient.

In order to obviate such an inconvenience this invention adopts the following method. Namely, the concentration of phosphorus in the phospho-silicate glass layer is reduced, and after holes are formed in the $SiO_2$ film which is capable of being accurately etched followed by the formation of electrodes, evaporated leads, thin film passive elements such as resistors, etc., an $SiO_2$ film containing a low concentration of phosphorus is formed on the structure.

Figure 2:
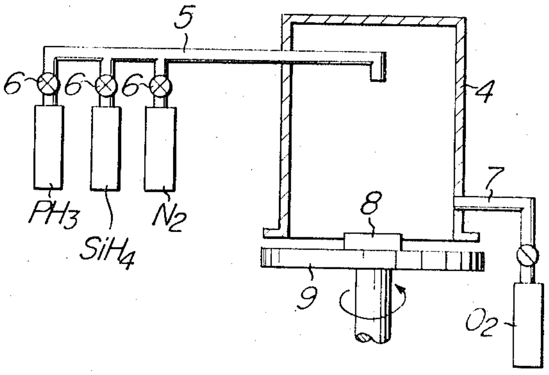
FIG. 2 is a schematic diagram of an arrangement forming the phospho-silicate glass used in the embodiment of this invention.

FIG. 2 shows a schematic diagram of an arrangement for forming an $SiO_2$ film by the oxidation of monosilane ($SiH_4$) and forming a phospho-silicate glass layer ($P_2O_5 \cdot SiO_2$) by introducing phosphine ($PH_3$) in the above decomposition reaction.

In FIG. 2, 4 is a reaction chamber into which $SiH_4$, $PH_3$ and $N_2$ or Ar, the latter being a carrier gas, are properly introduced through the pipe 5. Cocks 6 adjust the flow rate of the gases. Oxygen gas ($O_2$) is introduced through a pipe 7 in a predetermined amount. A semiconductor substrate 8 is mounted on a rotary hotplate 9 whose temperature is adjusted to from 250° to 550° C.

The gas flow rates are 600 cc/min for $SiH_4$ of 4 % $N_2$ dilution, 5 *l*/min for $N_2$, and 100 cc/min for $O_2$. The flow rate of $PH_3$ of 0.1 % $N_2$ dilution is adjusted between 30 and 1,000 cc/min in accordance with the desired concentration of phosphorus. The growth rate of the glass layer is 1,000 to 2,000 A/min. When the flow rate of $PH_3$ is zero, a pure $SiO_2$ film grows.

Figure 3:
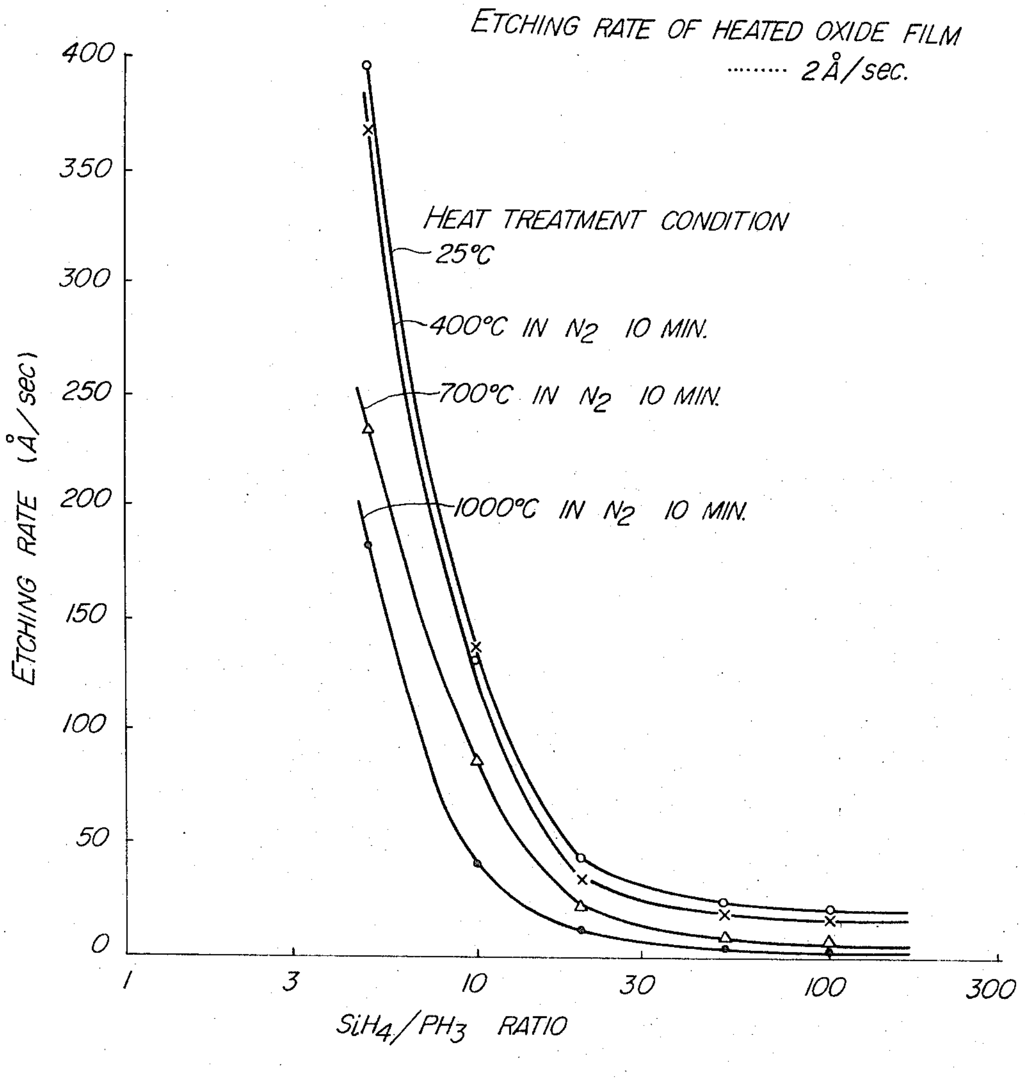
FIG. 3 shows the etching rate of an $SiO_2$ film (phospho-silicate glass film) doped with phosphorus as a function of the concentration of phosphorus and the temperature of heat treatment.

FIG. 3 shows the etching rate in a phosphorus-etching solution of the $P_2O_5 \cdot SiO_2$ glass made by the above-mentioned method as a function of the flow rate of $SiH_4/PH_3$ and the heat treatment after deposition. As the ratio of $SiH_4/PH_3$ becomes larger or the concentration of phosphorus becomes smaller, the etching rate becomes lower. Also the higher the temperature of heat treatment after deposition, the more reduced the etching rate. When the diffusion of phosphorus is made by a known high temperature diffusion method using $POCl_3$, etc., the etching rate is more than 200 A/sec as described before. It is seen in FIG. 3 that this invention makes it possible to control the etching rate over a wide range.

Figure 4:
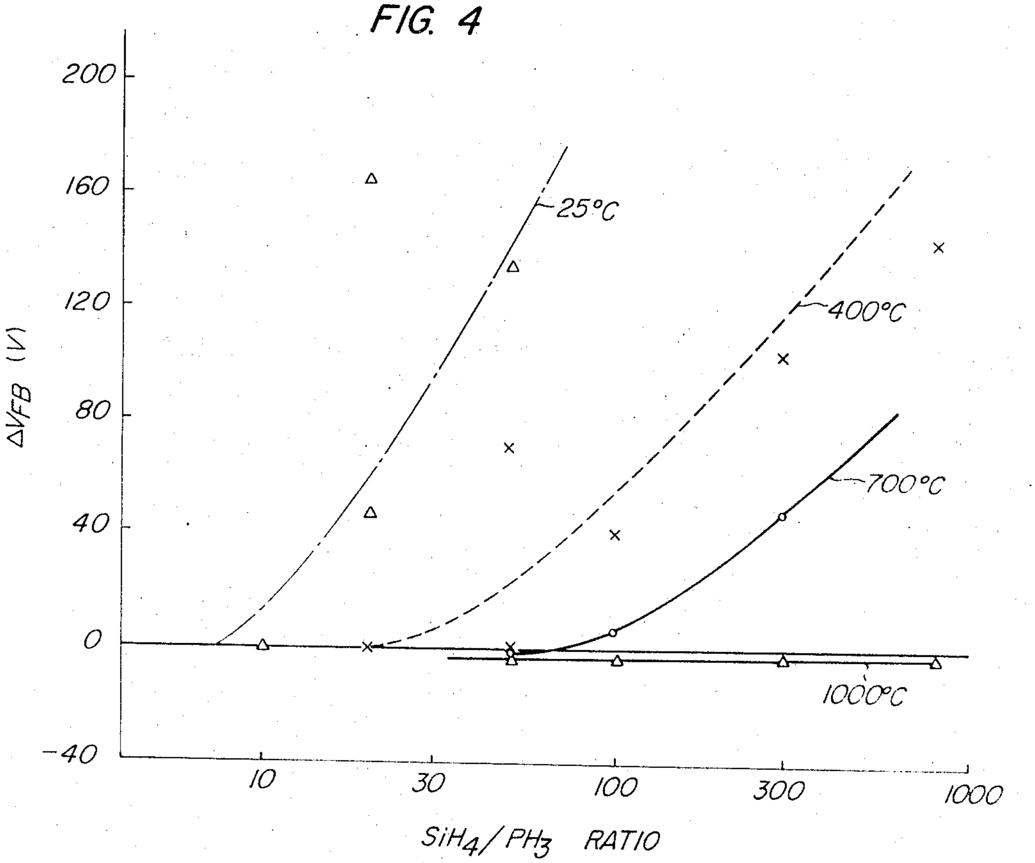
FIG. 4 shows the effect of B.T. treatment on an MOS type device having an $SiO_2$ layer (phospho-silicate glass layer) deped with phosphorus.

Next, the stabilization of the surface properties of phospho-silicate glass thus obtained will be explained. A pure $SiO_2$ film of a thickness of 2,500 to 3,000 A is grown on a (111) surface of a P-type silicon substrate having a resistivity of 100 Ω.cm by interrupting the supply of $PH_3$. A phospho-silicate ($P_2O_5 \cdot SiO_2$) glass layer of 2,500 to 3,000 A is grown successively thereon with the supply of $PH_3$. An aluminum electrode is mounted by evaporation on the glass surface to obtain an MOS structure. The difference $\Delta V_{FB}$ before and after the B.T. treatment with application of 30 V is measured and results as shown in FIG. 4 are obtained, the positive and negative polarities being given to the aluminum electrode and the silicon substrate, respectively. In FIG. 4 the characteristic curve of 25° C is one which was obtained just after the deposition of phospho-silicate glass without heat treatment. 400° C, 700° C, and 1,000° C are the temperatures of the heat treatment. The result shows a general tendency that when the concentration of phosphorus in phospho-silicate glass is high, a stable characteristic (a small $\Delta V_{FB}$) is obtained. The stabilization is promoted when the temperature of heat treatment after deposition is high. It is found therefore that the stabilization of surface properties is effected by a small concentration of phosphorus.

Through examination of FIGS. 3 and 4 it is seen that there is a region where the surface properties are stabilized with a small phosphorus concentration of the phospho-silicate glass and an extremely low value of etching rate. With a suitable combination of the concentration of phosphorus and the temperature of heat treatment it is possible to form a phospho-silicate glass layer having a desired etching rate and an excellent water-proof property.

Figure 5:
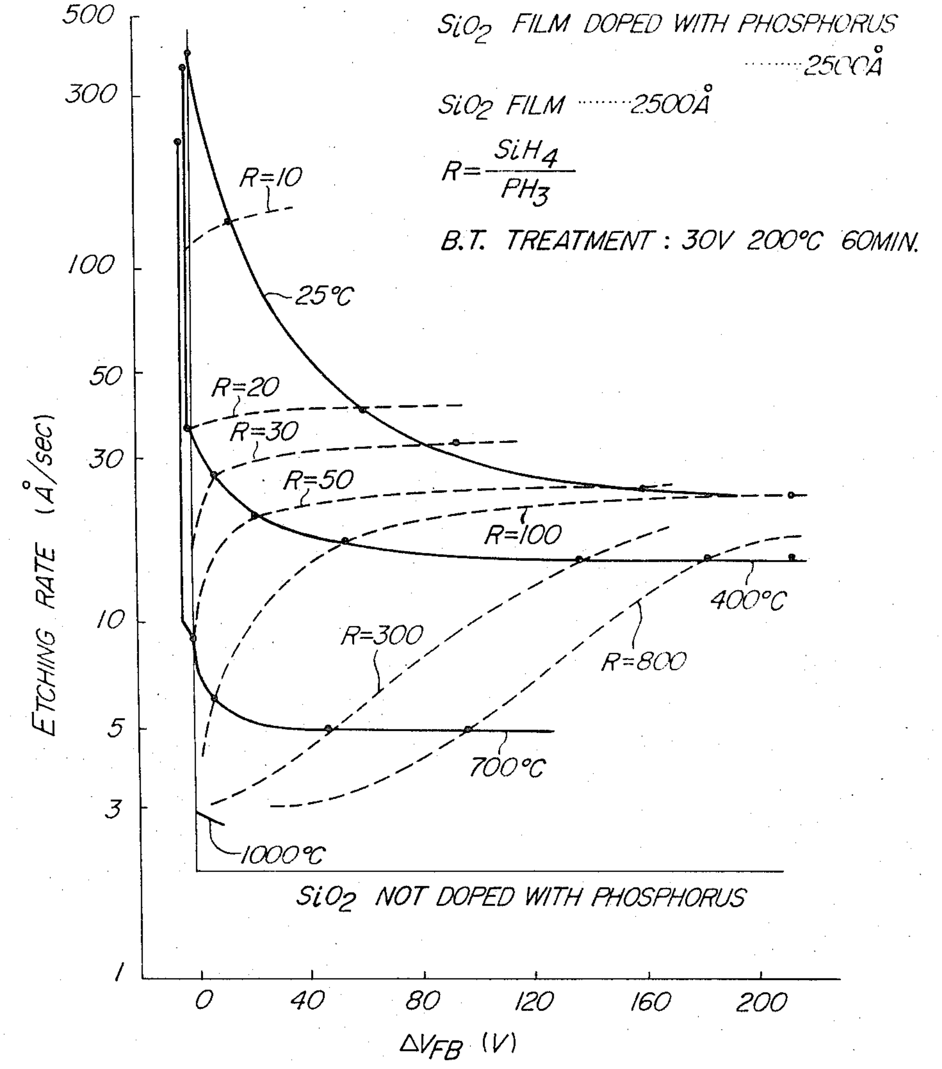
FIG. 5 shows the concentration of phosphorus, the etching rate, and the stabilization effect of the phospho-silicate glass formed by an $SiH_4$ oxidation method. This figure is obtained by a rearrangement of FIGS. 3 and 4.

FIG. 5 summarizes the results of FIGS. 3 and 4, which help to understand this invention. The ordinate indicates the etching rate of phospho-silicate glass, and the abscissa indicates the difference in surface properties before and after the B.T. treatment, i.e. the stabilization factor $\Delta V_{FB}$. The solid curves show the characteristics for some temperatures of heat treatment after the deposition of phospho-silicate glass and the dotted curves show the characteristics for some gas flow rates of $SiH_4/PH_3$ which corresponds to the concentration of phosphorus in phospho-silicate glass during the formation of the glass. The conventional method of forming phospho-silicate glass occupies the region where the abscissa is nearly zero and the ordinate is nearly 500 while the inventive method occupies the region where the abscissa is nearly zero and the ordinate is less then 10 or particularly less than 5. The advantages of this invention consist in the facts that the etching rate can be decreased to about 1/100 while maintaining a good stabilization and that the water-proof property of phospho-silicate glass is excellent in the above region.

Figure 6:
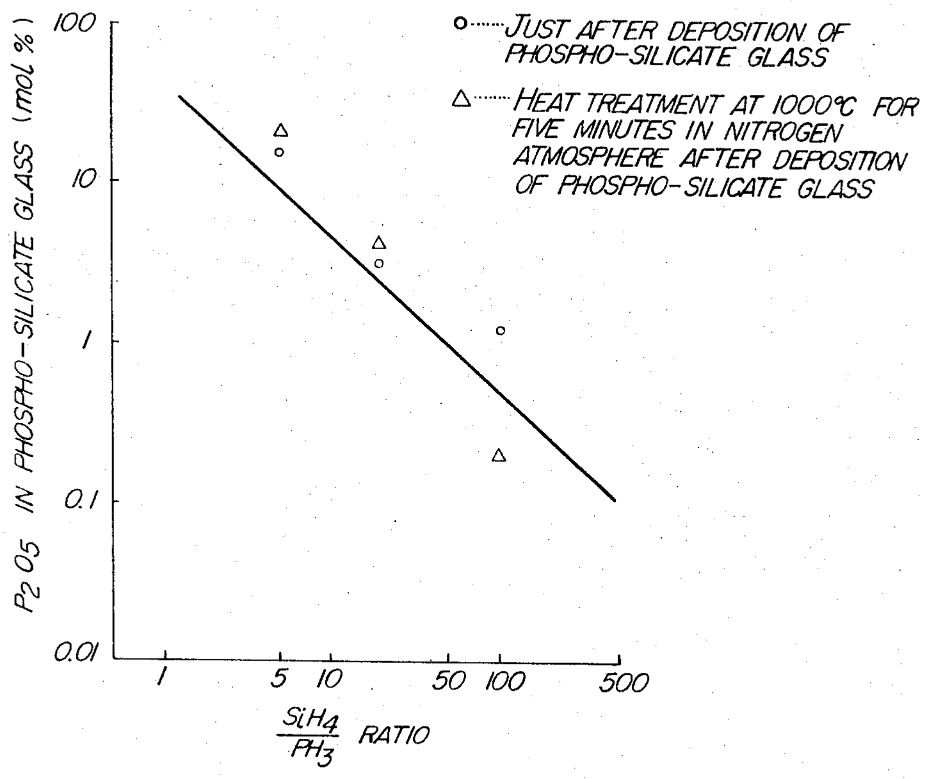
FIG. 6 shows relationship between the concentration of phosphorus and the reaction gas ratio in the $SiO_2$ layer doped with phosphorus and formed by the oxidation method.
Figure 9A:
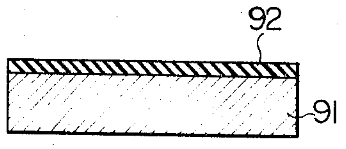
Figure 9B:
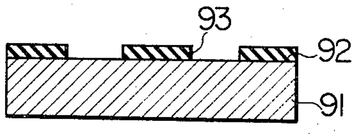
Figure 9C:
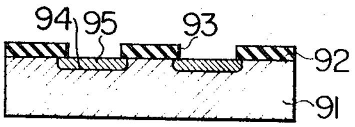
Figure 9D:
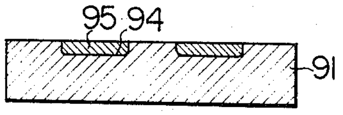
Figure 9E:
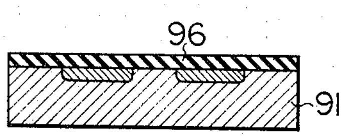
Figure 9F:
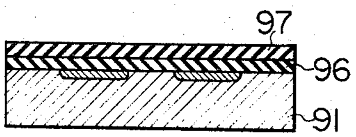
Figure 9G:
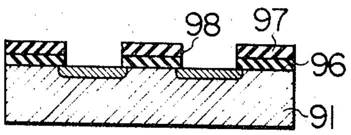
Figure 9H:
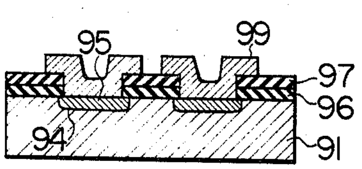

Although the concentration of phosphorus depicted in FIGS. 3 and 5 is expressed by the gas flow rate of $SiH_4/PH_3$, the real amount of phosphorus in the $SiO_2$ layer is as shown in FIG. 6, which shows the relationship between the concentration of phosphorus in $SiO_2$ doped with phosphorus by the oxidation method of $SiH_4$ and the reaction gas ratio.

As is evident from FIG. 6, the amount of phosphorus in the phospho-silicate glass film is determined substantially uniquely. Namely, the content of phosphorus in the glass having the etching rate of not more than 10 A/sec can be determined from FIG. 6. Actually, however, since the etching rate is a function of the temperature of heat treatment as shown in FIG. 3, it is difficult to determine the etching rate only by the amount of phosphorus. The reason is that a sintering type "Densification" phenomenon of the phospho-silicate glass is caused by the heat treatment after the low temperature deposition of the glass. This phenomenon is inherent only in the low temperature deposited glass and will disappear if the doping of the glass with such a low concentration of phosphorus is made possible even by a high temperature treatment. Then, the etching rate can be determined only by the concentration of phosphorus.

Although in the above example the formation of the $SiO_2$ film under the phospho-silicate glass film has been made by the oxidation method of $SiH_4$ for the sake of convenience, it may be made also by other methods such as an oxidation method of the silicon substrate at a high temperature or a thermal decomposition method of organo-oxysilane, e.g. tetraethoxysilane. Moreover, the thickness of the $SiO_2$ film need not be equal to that of the phospho-silicate glass layer but may be of such a value (not more than 500 A) as phosphorus may not diffuse by the heat treatment after the deposition into the surface of the silicon substrate through the $SiO_2$ layer. Then the ratio between the thickness of the $SiO_2$ film and the phospho-silicate glass film more or less deviates from the relations shown in FIG. 5, but the deviation is slight.

Figure 7:
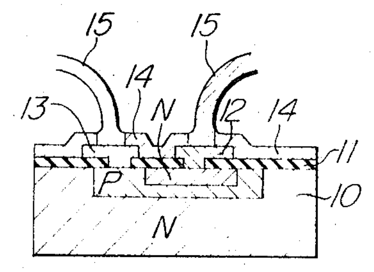
FIG. 7 is a longitudinal sectional view of a planar type transistor according to one embodiment of this invention.

A description of the application of this invention to a planar type transistor will now be given. Here the situation is somewhat different from the step formation of a hole or holes in the dual layer, of $SiO_2$ and phsopho-silicate glass. As shown in FIG. 7, holes are first accurately formed in the $SiO_2$ layer and thereafter a desired electrode metal is evaporated to form a semiconductor device. The above process is the same as the conventional planar method. In this embodiment, a phospho-silicate glass layer having a low concentration of phosphorus is deposited to entirely cover the electrode metal. The portion of the phospho-silicate glass layer lying on the electrode metal is perforated to evaporate thereon an electrode metal for the external electrode.

The method of producing the planar type transistor as shown in FIG. 7 is as follows. The temperature of the semiconductor device 10 is adjusted between 300° and 350° C on the hot-plate shown in FIG. 2. When 600 cc/min of $SiH_4$ of 4 % $N_2$ dilution, 5 $l$/min of $N_2$, 100 cc/min of $O_2$ and 2,400 cc/min of $PH_3$ of 0.1 % $N_2$ dilution are passed over the semiconductor device, phospho-silicate glass is deposited on the $SiO_2$ film 11, the emitter electrode 12 and the base electrode 13 at a rate of 2,000 A/min. In a few minutes a phospho-silicate glass thin film of about 5,000 A thickness is obtained. Desired portions of the phospho-silicate glass thin film 14 (the portions corresponding to the emitter and base electrodes) are selectively etched using the well-known technique. Au lead wires 15 are provided on the selected portions, obtaining thus the semiconductor device as shown in FIG. 7.

Since in this embodiment the semiconductor substrate is heated to 300° to 350° C in the process of forming the phospho-silicate glass, additional heat treatment for introducing phosphorus existing in the phospho-silicate glass into the $SiO_2$ film is not necessary.

Next, a plurality of conventional planar type $P^+N$ junction silicon diodes are formed as follows. An $SiO_2$ film is provided on the surface of an N type silicon substrate. A portion of the $SiO_2$ film is perforated to diffuse boron therethrough into the silicon substrate to form a $P^+N$ diode. Electrodes are provided on the $P^+$ and N sides.

The inventive method is applied to the diodes thus obtained. Namely, an $SiO_2$ film having a small concentration of phosphorus is provided to cover the existing $SiO_2$ film and the electrode metal. The portion of phospho-silicate glass lying on the electrode metal is removed to provide external electrodes thereon.

Figure 8:
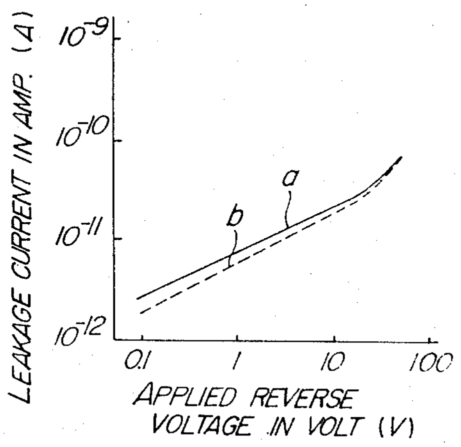
FIG. 8 shows the result of a forced stress life test of an inventive planar type $P^+N$ junction silicon diode provided with the phospho-silicate glass layer.

A result of forced deterioration tests of the $P^+N$ junction silicon diode thus obtained is shown in FIG. 8.

In FIG. 8, the curve *a* shows the leakage current vs. reverse voltage characteristics of the $P^+N$ junction silicon diode obtained before the forced deterioration test thereof and the curve *b* shows the leakage current vs. reverse voltage characteristic of the $P^+N$ junction silicon diode with the phospho-silicate glass thin film after being subjected to the conditions of 200° C in temperature and 10 V in reverse voltage for 4 hours.

According to FIG. 8 it is seen that the inventive semiconductor device with a phospho-silicate glass thin film is hard to deteriorate. On the contrary, in the conventional semiconductor device the leakage current usually increases by a few orders of magnitude by the forced deterioration test. The phospho-silicate glass thin film is effective as a passivation film of electrodes. The destruction of electrodes due to a mechanical damage during assembly and usage, disconnection of lead, and short-circuiting with adjacent metals are also prevented.

As evident from the foregoing description, since the semiconductor passivation film according to this invention has a low etching rate of about 1/100 times that of the conventional phospho-silicate glass, the stability of the electrical characteritiscs of the semiconductor device is much improved. Moreover, the inventive phospho-silicate glass, being excellent in water-proof property, is stable against the external atmosphere, particularly moisture.

Therefore, a fine perforation of the order of 2 $\mu$ width becomes possible and stabilization of the characteristics of a high frequency and high speed transistor and monolithic integrated circuit or hybrid integrated circuit can be attained.

In this invention it is possible to interpose electrode metals or thin film circuit components such as an evaporated resistor element formed of e.g. nichrome, and a capacitor element using tantalum oxide between the phospho-silicate glass layer and the underlying $SiO_2$ layer.

The process steps of manufacturing a semiconductor device according to the present invention are schematically illustrated in FIGS. *9a* to *9h* by way of example. As shown in FIG. *9a*, a silicon oxide layer 92 is initially formed on a silicon wafer 91. Then, as illustrated in FIG. *9b*, holes 93 are provided in the silicon oxide layer 92 in order to expose surface portions of the silicon wafer 91. Through these holes 93, an impurity, which has an opposite conductivity type to that of the wafer 91, is diffused into the wafer 91 through the holes 93 to form diffused region 95 with PN junctions 94 formed between the diffused regions 95 and the wafer 91, as shown in FIG. *9c*.

Next, the initially formed silicon oxide layer 92 is removed completely by a mixture of fluoric acid and water, as illustrated in FIG. *9d* and a fresh silicon oxide layer 96 is formed on the entire surface of the wafer 91, as depicted in FIG. *9e*. Then, as shown in FIG. *9f*, another silicon oxide layer 97, containing phosphorus, is deposited on top of the silicon oxide layer 96. Holes 98 are then formed through the dual silicon oxide layer 96 and 97 to expose the diffused regions 95, as shown in FIG. *9g*, and metallic electrodes 99 are deposited through these holes 98 on the exposed surfaces of the diffused regions 95, as shown in FIG. *9h*. Finally, lead wires may be attached to the metal electrodes 99 to form a completed semiconductor device.

Although in the above embodiment the stabilization of an MOS type device is described with regard to $V_{FB}$, it is needless to say that this method can also be applied to the stabilization of transistors and an integrated circuits. According to the present invention the phospho-silicate glass layer is formed by the above-mentioned method on a semiconductor device after the diffusion in the planar process and then the structure is subjected to heat treatment, thereby realizing the stabilization of the surface properties to form a semiconductor device having a long life and a high reliability.

We claim:

1. A method of producing a semiconductor device comprising the steps of (a) forming a silicon oxide layer on the surface of a semiconductor substrate by oxidizing the surface thereof, (b) forming at least one hole of desired pattern in the silicon oxide layer to expose a predetermined part of the surface of the substrate, (c) diffusing an impurity through the hole into the semiconductor substrate to form at least one PN junction whose periphery extends to the surface of the substrate, (d) removing all of the silicon oxide layer on the surface of the substrate, (e) forming a fresh silicon oxide layer on the surface of the substrate, and (f) exposing the semiconductor substrate with its fresh silicon oxide layer thereon to a gas mixture of silane, oxygen, phosphine and a carrier gas at temperatures of from about 250° to 550° C, to deposit another silicon oxide layer including phosphorus on the fresh silicon oxide layer thereby forming a dual passivation film, wherein the amount of phosphorus in said another silicon oxide layer is adjusted by controlling the volume of phosphine in said gas mixture, so that said another silicon oxide layer has an etching rate less than 10 A/min. in an etching solution consisting essentially of 15 parts of hydrofluoric acid, 10 parts of nitric acid and 300 parts of water, by volume.

2. A method of producing a semiconductor device comprising the steps of (a) forming a silicon oxide layer on the surface of a semiconductor substrate by oxidizing the surface thereof, (b) forming at least one hole of desired pattern in the silicon oxide layer to expose a predetermined part of the surface of the substrate, (c) diffusing an impurity through the hole into the semiconductor substrate to form at least one PN junction whose periphery extends to the surface of the substrate, (d) removing all of the silicon oxide layer on the surface of the substrate, (e) forming a fresh silicon oxide layer on the surface of the substrate, and (f) exposing the semiconductor substrate with its fresh silicon oxide layer thereon to a gas mixture of silane, oxygen, phosphine and a carrier gas at temperatures of from about 250° to 550° C, wherein the volume ratio of silane to phosphine is at least 50, to deposit another silicon oxide layer including phosphorus on the fresh silicon oxide layer thereby forming a dual passivation film.

* * * * *